(12) United States Patent
Lee et al.

(10) Patent No.: US 8,021,034 B2
(45) Date of Patent: Sep. 20, 2011

(54) BACKLIGHT ASSEMBLY AND DISPLAY DEVICE HAVING THE SAME

(75) Inventors: Jeoung-Gwen Lee, Suwon-si (KR); Hyo-Hyun Park, Suseong-gu (KR)

(73) Assignee: Samsung Electronics Co., Ltd., Suwon-Si, Gyeonngi-Do (KR)

( * ) Notice: Subject to any disclaimer, the term of this patent is extended or adjusted under 35 U.S.C. 154(b) by 416 days.

(21) Appl. No.: 12/209,015

(22) Filed: Sep. 11, 2008

(65) Prior Publication Data
US 2009/0002601 A1   Jan. 1, 2009

(30) Foreign Application Priority Data

Jun. 11, 2007 (KR) .................. 10-2007-0112727

(51) Int. Cl.
*F21V 7/04* (2006.01)
(52) U.S. Cl. .................. 362/633; 362/634; 349/58
(58) Field of Classification Search .......... 362/633–634; 349/58
See application file for complete search history.

(56) References Cited

U.S. PATENT DOCUMENTS

| 2005/0276076 | A1* | 12/2005 | Shin | 362/633 |
| 2006/0187679 | A1* | 8/2006 | Cha et al. | 362/633 |
| 2006/0203144 | A1* | 9/2006 | Kim | 349/58 |
| 2008/0079863 | A1* | 4/2008 | Jung et al. | 349/58 |

* cited by examiner

*Primary Examiner* — Jason Moon Han
*Assistant Examiner* — Sean Gramling
(74) *Attorney, Agent, or Firm* — F. Chau & Associates, LLC

(57) ABSTRACT

In a backlight assembly of a display device, a supporting frame receives a light-guide plate while exposing a light-exiting surface of the light-guide plate. A first receiving member covers an opposite surface of the light-guide plate facing the light-exiting surface, and a side first portion of the light-guide plate adjacent to a first side surface is inserted into a first sidewall portion of the first receiving member. A first light source is disposed between the first side surface and the first sidewall portion. A first reflective sheet is extended along an inner surface of the first receiving member and surrounds the first light source. The backlight assembly may further comprise a second receiving member, a second light source, and a second reflective sheet. A lamp reflector may be omitted, assemblability of the backlight assembly and the display device, and protection against heat, may be improved.

21 Claims, 12 Drawing Sheets

BACKLIGHT ASSEMBLY AND DISPLAY DEVICE HAVING THE SAME

CROSS-REFERENCE TO RELATED APPLICATIONS

This application claims priority under 35 U.S.C. §119 to Korean Patent Application No. 2007-112727, filed on Nov. 6, 2007 in the Korean Intellectual Property Office (KIPO), the contents of which are herein incorporated by reference in their entirety.

BACKGROUND OF THE INVENTION

1. Field of the Invention

The present disclosure is directed to a backlight assembly and a display device having the backlight assembly. More particularly, the present disclosure is directed to a backlight assembly used for a flat display device and a display device having the backlight assembly.

2. Description of the Related Art

Due to rapid advances in semiconductor technology, electronic equipment is now smaller, thinner, lighter in weight, and has lower driving voltages, lower power consumption, etc. Flat panel display devices having the above characteristics are becoming more in demand.

Liquid crystal display (LCD) devices, which are a type of flat panel display, are also thinner, lighter, and have lower power consumption and lower driving voltages than other types of display devices, and have high color reproducibility that is close to that of cathode ray tube (CRT) display devices. Thus, LCD devices have been widely used in various fields.

A backlight assembly of a conventional LCD device is classified as either a direct illumination type backlight assembly or an edge illumination type backlight assembly according to the location of light sources.

In the direct illumination type backlight assembly, the light sources are disposed under a display panel of the LCD device. In the edge illumination type backlight assembly, the light sources are disposed at a side portion of a light-guide plate and supply the display panel with light.

In the edge illumination type backlight assembly, a receiving container and mold frame that receives optical members such as the light-guide plate and supports the display panel have various structures. For example, the edge illumination type backlight assembly used for a notebook computer includes the light-guide plate, a mold frame receiving a lamp, optical sheets and a back cover covering a rear surface of the mold frame. The lamp surrounded by a lamp reflector is disposed at a sidewall of the mold frame.

The edge illumination type backlight assembly used for a monitor of a desktop computer includes a bottom chassis receiving the light-guide plate and a supporting frame receiving the light-guide plate and facing the bottom chassis. The lamp is inserted into the lamp reflector, and the side surface portion of the light-guide plate is inserted into the lamp reflector.

The edge illumination type backlight assembly may include many elements surrounding the lamp that interfere with the dissipation of heat generated from the lamp, having an adverse effect on the display panel.

Also, as the number of the elements increases, the weight and thickness of the backlight assembly also increases, increasing the weight and thickness of the LCD device.

To decrease the weight, thickness and volume of the backlight assembly, it is desirable to decrease the number of the elements of the backlight assembly.

SUMMARY OF THE INVENTION

Embodiments of the present invention provide a backlight assembly capable of decreasing the number of elements, facilitating assembly, improving heat dissipation, and also a display device having the backlight assembly.

In an exemplary backlight assembly according to an embodiment of the present invention, the backlight assembly includes a light-guide plate, a supporting frame, a first light-supplying module and a second receiving member. The light-guide plate includes a light-exiting surface, an opposite surface facing the light-exiting surface, a first side surface and a second side surface facing the first side surface, the first and second side surfaces connecting the light-exiting surface with the opposite surface. The supporting frame exposes a portion of the light-exiting surface and receives the light-guide plate. The first light-supplying module includes a first receiving member, a first light source and a first reflective sheet. The first receiving member has a first bottom and a first sidewall portion. The first bottom surface covers at least some portion of the opposite surface. The first sidewall portion is disposed between the supporting frame and the first side surface. The first sidewall portion receives a side first portion of the light-guide plate adjacent to the first side surface. The first light source is disposed between the first side surface and the first sidewall portion. The first reflective sheet faces the first side surface and the opposite surface to surround the first light source between the light-guide plate and the first receiving member. The second light-supplying module includes a second receiving member, a second light source and a second reflective sheet. The second receiving member has a second bottom surface connected to an edge of the first bottom surface to cover at least the other portion of the opposite surface, and a second sidewall portion to receive a second side portion of the light-guide plate adjacent to the second side surface. The second light source is disposed between the second side surface and the second sidewall portion. The second reflective sheet faces the second side surface and the opposite surface to surround the second light source between the light-guide plate and the second receiving member. The second reflective sheet is partly overlapped with the first reflective sheet The supporting frame may include an upper frame part, a first side frame part and a second side frame part, and a third side frame part and a fourth side frame part. The upper frame part may expose the portion of the light-exiting surface and may support edges of the light-exiting surface. The first side frame part and a second side frame part respectively may face an outer surface of the first sidewall portion and an outer surface of the second sidewall portion. The third side frame part and a fourth side frame part may be respectively connected to the first side frame part and the second side frame part.

The first receiving member may further include a third sidewall portion and a fourth sidewall portion. The second receiving member may further include a fifth sidewall portion and a sixth sidewall portion. The third sidewall portion faces an outer surface of the third side frame part and the fourth sidewall portion faces an outer surface of the fourth side frame part. The fifth sidewall portion faces the outer surface of the third side frame part and the sixth sidewall portion faces the outer surface of the fourth side frame part.

First combining units may be formed in each of the third side frame part and the fourth side frame part. Second combining units combined with some of the first combining units may be formed at the third sidewall portion and the fourth sidewall portion. Third combining units combined with the other of the first combining units may be formed at the fifth sidewall portion and the sixth sidewall portion. A first coupling unit may be formed at end portions along a longitudinal direction of the third sidewall portion and the fourth sidewall portion. A second coupling unit coupled to the first coupling unit may be formed at each of end portions along a longitudinal direction of the fifth sidewall portion and the sixth sidewall portion.

A stepped portion respectively stepped to the third side frame part and the fourth side frame part may be formed at the end portions along a longitudinal direction of the fifth sidewall portion and the sixth sidewall portion. The first coupling unit may be formed at the stepped portion. The first coupling unit may include a coupling hole. The second coupling unit may include a coupling protrusion protruded from a base surface of the stepped portion coupled with the coupling hole.

The light-guide plate may further include a third side surface facing the third side frame part and a fourth side surface facing the fourth side frame part. A guiding groove may be formed at each of the third side surface and the fourth side. A guiding unit inserted into the guiding groove may be respectively protruded from the third side frame part and the fourth side frame part. A movement-prevention groove may be formed at a lower surface of the guiding unit. A movement-prevention protrusion may be formed in the first bottom surface and inserted into the movement-prevention groove to prevent movement of the supporting frame to the first light source or the second light source due to external impacts.

The first light source may include a first lamp, a first power supply wire and a second power supply wire. The first lamp may have a first lamp body, a first electrode unit and a second electrode unit. The first lamp body is disposed between the first side surface and the first reflective sheet. The first electrode unit and a second electrode unit are disposed on end portions of the first lamp body that face each other. The first power supply wire may be electrically connected with the first electrode unit to supply lamp driving power. The second power supply wire may be electrically connected with the second electrode unit and may be guided toward the first electrode unit along the outside of the first bottom surface.

The second light source may include a second lamp, a third power supply wire and a fourth power supply wire. The second lamp may have a second lamp body, a third electrode unit and a fourth electrode unit. The second lamp body is disposed between the second side surface and the second reflective sheet. The third electrode unit and the fourth electrode unit are disposed on end portions of the second lamp body that face each other. The third power supply wire may be electrically connected with the third electrode unit to supply lamp driving power. The fourth power supply wire may be electrically connected with the fourth electrode unit and may be guided toward the fourth electrode unit along the upper frame part.

A wire-guiding groove guiding the third power supply wire may be formed at an upper surface of the upper frame part corresponding to the second lamp body. A first wire-aligning unit and a second wire-aligning unit may be formed at an outer surface of the third side frame part. The first wire-aligning unit may guide the first power supply wire and the second power supply wire to the outside of the first bottom surface. The first power supply wire may be guided through the third side frame part and the second power supply wire may be guided to the third side frame part along the outside of the first bottom surface. The second wire-aligning unit may guide the third power supply wire and the fourth power supply wire to the outside of the second bottom surface. The third power supply wire may be guided through the third side frame part and the fourth power supply wire may be guided to the third side frame part along the wire-guiding groove. A first wire-guiding unit and a second wire-guiding unit may be formed at an outer surface of the fourth side frame part. The first wire-guiding unit may guide the second power supply wire corresponding to the second electrode unit. The second wire-guiding unit may guide the fourth power supply wire corresponding to the fourth electrode unit.

The first reflective sheet and the second reflective sheet may be respectively coated on the inner surface of the first receiving member and the inner surface of the second receiving member. The first reflective sheet and the second reflective sheet may be integrated with each other. The backlight assembly may further include an adhesive member. The adhesive member may fix the first bottom surface with the second bottom surface by respectively adhering to the first bottom surface and the second bottom surface along the edge of the second bottom surface connected with the edge of the first bottom surface.

In a display device according to an embodiment of the present invention, the display device includes a light-guide plate, a first light-supplying module, a second light-supplying module, a supporting frame and a display panel module. The light-guide plate includes a light-exiting surface, an opposite surface facing the light-exiting surface, a first side surface and a second side surface facing the first side surface. The first and second side surfaces connect the light-exiting surface with the opposite surface. The first light-supplying module includes a first receiving member and a first light source unit. The first receiving member has a first bottom surface to cover at least some portion of the opposite surface and a first sidewall portion to receive at least a side first portion of the light-guide plate adjacent to the first side surface. The first light source unit is disposed between the first side surface and the first sidewall portion. The second light-supplying module includes a second receiving member and a second light source unit. The second receiving member has a second bottom surface to cover at least the other portion of the opposite surface and a second sidewall portion to receive at least a side second portion of the light-guide plate adjacent to the second side surface. The second light source unit is disposed between the second side surface and the second sidewall portion. The supporting frame includes an upper frame part that supports edges of the light-exiting surface, and side frame parts that have first combining units combined respectively with the first receiving member and the second receiving member. The display panel module includes a display panel disposed on the supporting frame.

The first receiving member may further include a third sidewall portion and a fourth sidewall portion. The third sidewall portion and the fourth sidewall portion face each other. The third sidewall portion and the fourth sidewall portion are substantially perpendicular to the first sidewall portion and have second combining units combined with the first combining units. The second combining units are formed at the third sidewall portion and the fourth sidewall portion and are combined with some of the first combining units. The second receiving member may further include a fifth sidewall portion and a sixth sidewall portion. The fifth sidewall portion and the sixth sidewall portion face each other. The fifth sidewall portion and the sixth sidewall portion are substantially perpendicular to the second sidewall portion and have third combining units combined with the first combining units.

A first coupling unit may be further formed at end portions along a longitudinal direction of the third sidewall portion and the fourth sidewall portion. A stepped portion may be further formed at end portions along a longitudinal direction of the fifth sidewall portion and the sixth sidewall portion. The stepped portion may be stepped to the side portion of the supporting frame. The second coupling unit may be formed on a base surface of the stepped portion and couple first coupling unit.

The light-guide plate may further include a third side surface and a fourth side surface that connect the first side surface with the second side surface and face the side frame parts. The third side surface and the fourth side surface face each other and connect the third side surface with the third side surface. A guiding groove may be formed at each of the third side surface and the fourth side surface. A guiding unit inserted into the guiding groove may be respectively protruded from an inner surface of the side portion. A movement-prevention groove may be formed at a lower surface of the guiding unit. A movement-prevention protrusion inserted into the movement-prevention groove may be formed at the first bottom surface.

The first light source unit may include a first lamp, a first reflective sheet, a first power supply wire and a second power supply wire. The first lamp may have a first lamp body, a first electrode unit and a second electrode unit. The first lamp body supplies the first side surface with light, and the first electrode unit and the second electrode unit are disposed on end portions of the first lamp body that face each other. The first reflective sheet may be extended along the opposite surface to surround the first lamp and may receive receiving a first side portion of the light-guide plate adjacent to the first side surface. The first power supply wire may supply the first electrode unit with lamp driving power. The second power supply wire may be electrically connected with the second electrode unit and may be guided toward the first electrode unit along the outside of the first bottom surface corresponding to the portion of the edge of the display device.

The second light source unit may include a second lamp, a second reflective sheet, a third power supply wire and a fourth power supply wire. The second lamp may have a second lamp body, a third electrode unit and a fourth electrode unit. The second lamp body supplies the second side surface with light, and the third electrode unit and the fourth electrode unit are disposed on end portions of the second lamp body that face each other. The second reflective sheet may be extended along opposite surface to surround the second lamp and may receive a second side portion of the light-guide plate adjacent to the second side surface. The third power supply wire may supply the third electrode unit with lamp driving power. The fourth power supply wire may be electrically connected with the fourth electrode unit and may be guided toward the third electrode unit by a wire-guiding groove formed at an upper surface of the upper frame.

In the backlight assembly and the display device having the backlight assembly according to the present invention, a lamp reflector may be omitted, where the backlight assembly may be more easily assembled and repaired. Also, heat dissipation of the backlight assembly may be improved.

BRIEF DESCRIPTION OF THE DRAWINGS

The above and other features of embodiments of the present invention will become more apparent by describing in detail exemplary embodiments thereof with reference to the accompanying drawings.

DETAILED DESCRIPTION OF EXEMPLARY EMBODIMENTS

Embodiments of the invention are described more fully hereinafter with reference to the accompanying drawings, in which embodiments of the invention are shown. This invention may, however, be embodied in many different forms and should not be construed as limited to the embodiments set forth herein. Like numbers refer to like elements throughout. As Hereinafter, embodiments of the present invention will be explained in detail with reference to the accompanying drawings.

Backlight Assembly

Figure 1:
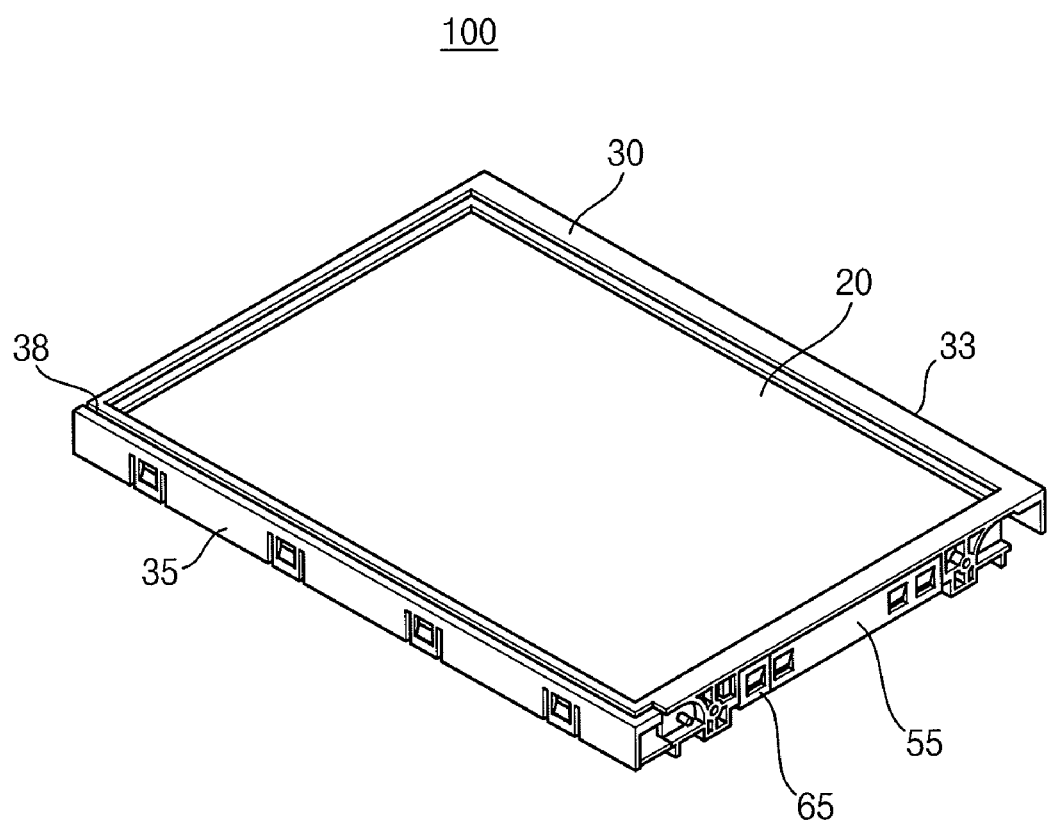
FIG. 1 is a perspective view illustrating a backlight assembly according to an exemplary embodiment of the present invention.
Figure 2:
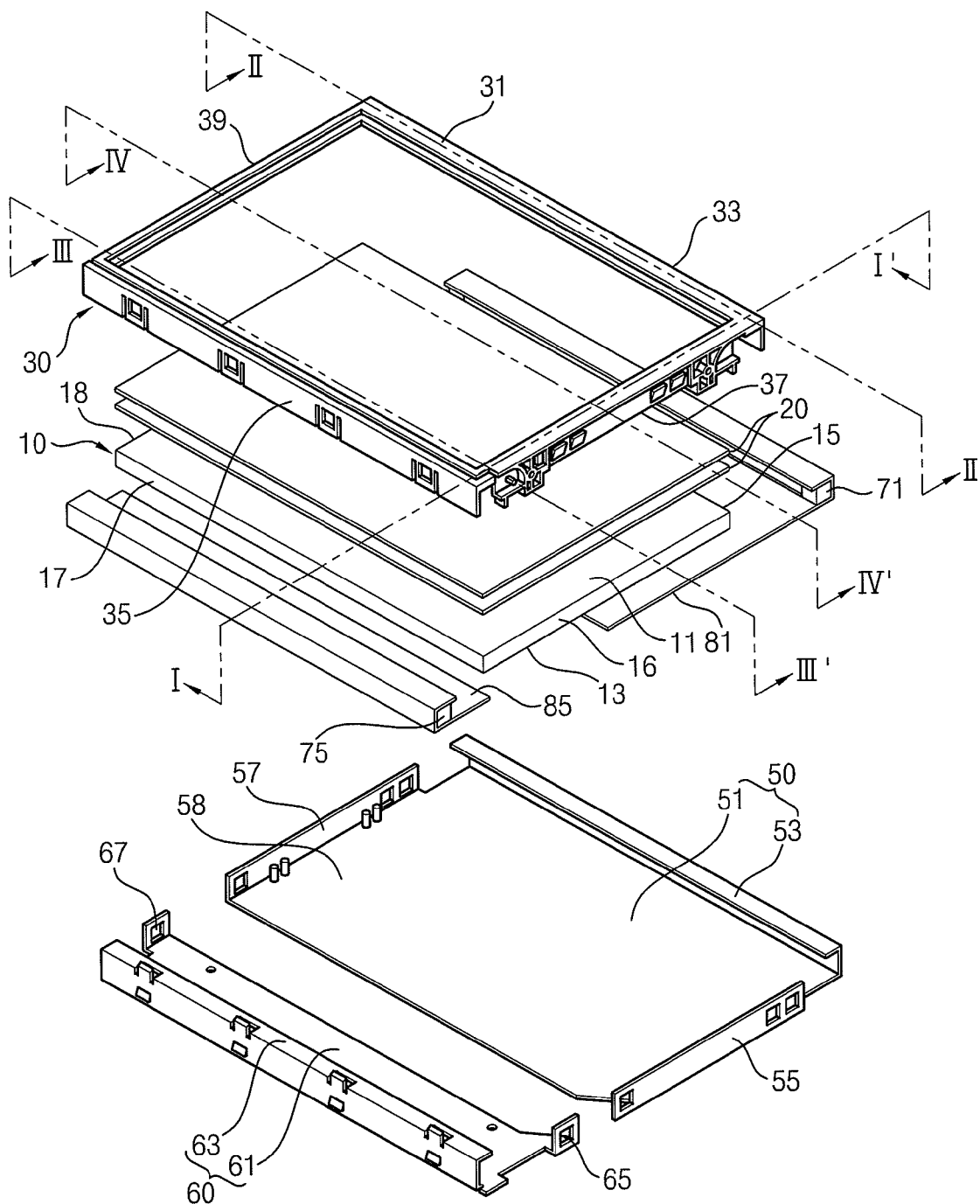
FIG. 2 is an exploded perspective view illustrating the backlight assembly in FIG. 1.

FIG. 1 is a perspective view illustrating a backlight assembly according to an exemplary embodiment of the present invention. FIG. 2 is an exploded perspective view illustrating the backlight assembly in FIG. 1.

Referring to FIGS. 1 and 2, the backlight assembly 100 includes a light-guide plate 10, a supporting frame 30 and a first light-supplying module having a first receiving member 50, a first light source 71 and a first reflective sheet 81.

The light-guide plate 10 diffuses incident light and guides the light and the light exits the light-guide plate 10 through a light-exiting surface 11. The light-guide plate 10 may have a flat shape having a substantially uniform thickness. The light-guide plate 10 includes the light-exiting surface 11, an opposite surface 13, a first side surface 15, a second side surface 17, a third side surface 16 and a fourth side surface 18.

The light-exiting surface 11 and the opposite surface 13 face each other. The first side surface 15 and the second side surface 17 face each other, and connect the light-exiting surface 11 with the opposite surface 13. The third side surface 16 and the fourth side surface 18 face each other and are respectively connected to the first side surface 15 and the second side surface 17. Incident light that is incident into the light-guide plate 10 through a selected side surface among the first side surface 15, the second side surface 17, the third side surface 16 and the fourth side surface 18 is reflected between the light-exiting surface 11 and the opposite surface 13, and the reflected light is diffused in the interior of the light-guide plate 10. When predetermined conditions are satisfied, the light exits the light-guide plate 10 through the light-exiting surface 11.

For example, the light-guide plate 10 may include a light-scattering material having excellent light transmissibility, thermostability, chemical resistance, mechanical strength, and so on. Examples of the light-scattering material that may be used for the light-guide plate 10 include polymethyl methacrylate, polyamide, polyimide, polypropylene, polyurethane, etc.

The backlight assembly 100 may further include an optical sheet 20. The optical sheet 20 is disposed on the light-exiting surface 11 and improves luminance uniformity and luminance in a direction substantially perpendicular to the light-exiting surface 11.

Figure 3:
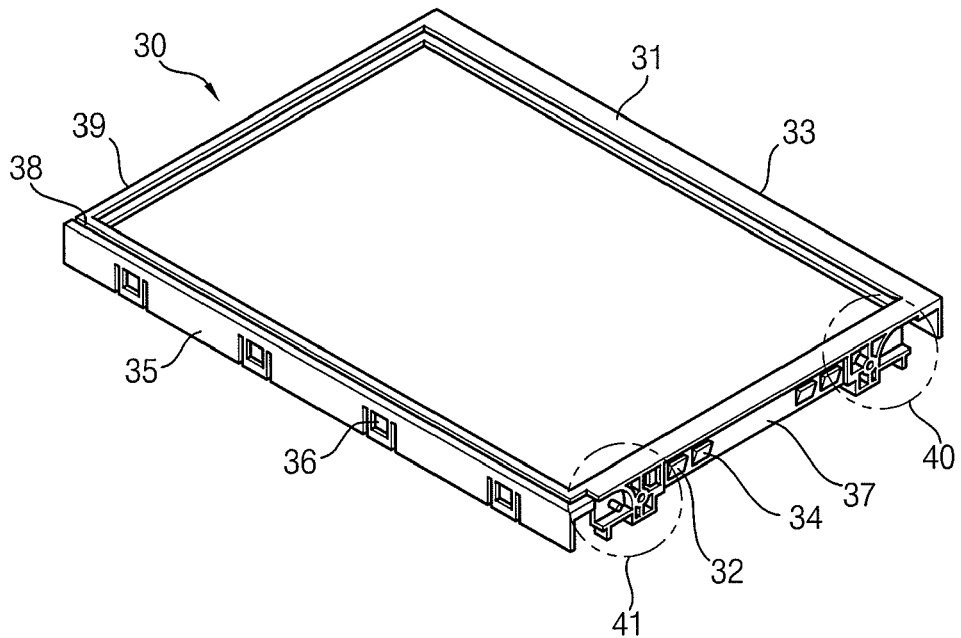
FIG. 3 is a perspective view illustrating a supporting frame in FIG. 2.

FIG. 3 is a perspective view illustrating the supporting frame in FIG. 2

Referring to FIG. 3, the supporting frame 30 receives the light-guide plate 10, and exposes the light-exiting surface 11 of the light-guide plate 10. The supporting frame 30 includes an upper frame 31, a first side frame 33, a second side frame 35, a third side frame 37 and a fourth side frame 39.

An opening exposing the light-exiting surface 11 is formed at the upper frame 31, and the upper frame 31 supports edges of the light-exiting surface 11. The first side frame 33, the second side frame 35, the third side frame 37 and the fourth side frame 39 are extended from the upper frame 31 and correspond to the first side surface 15, the second side surface 17, the third side surface 16 and the fourth side surface 18 of the light-guide plate 10, respectively.

The supporting frame 30 has a substantially rectangular frame shape. The first side frame 33 and the second side frame 35 correspond to longitudinal sides of the rectangular frame shape, respectively. The third side frame 37 and the fourth side frame 39 correspond to horizontal sides of the rectangular frame shape, respectively.

The supporting frame 30 is connected to the first light-supplying module. Combining holes 36 through which the supporting frame 30 is connected to the first light-supply module may be formed at the first side frame 33 and the second side frame 35. Also, first combining units 32 and 34 may be formed in the third side frame 37 and the fourth side frame 39.

Figure 4:
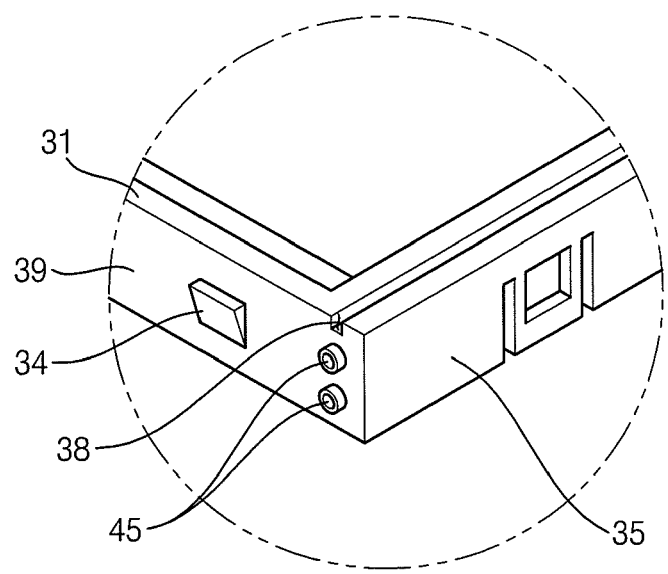
FIG. 4 is a perspective view illustrating a side frame part including a wire-guiding unit.

FIG. 4 is a perspective view illustrating a side frame including a wire-guiding unit.

Referring to FIGS. 3 and 4, a first wire-guiding unit may be formed at a first edge of the fourth side frame 39. A second wire-guiding unit 45 may be formed at a second edge of the fourth side frame 39. The second wire-guiding unit 45 has a cylindrical shape oriented perpendicular to the fourth side frame 39 and is protruded from an outer surface of the fourth side frame 39. The second wire-guiding unit 45 is formed through the fourth side frame 39 between an inner surface of the fourth side frame 39 and the outer surface of the fourth side frame 39.

A wire-guiding groove 38 may be formed in the second side frame 35 between the third side frame 37 and the fourth side frame 39. A wire guided through the second wire-guiding unit 45 is bent and inserted into the wire-guiding groove 38. The wire is guided along the wire-guiding groove 38. The supporting frame 30 will be further described with reference to the first light-supplying module as follows.

The first light-supplying module receives the light-guide plate 10 and is coupled to a lower portion of the supporting frame 30. The first light-supplying module supplies the light to the first side surface 15 of the light-guide plate 10. The first light-supplying module includes a first receiving member 50, a first light source 71 and a first reflective sheet 81.

Figure 5:
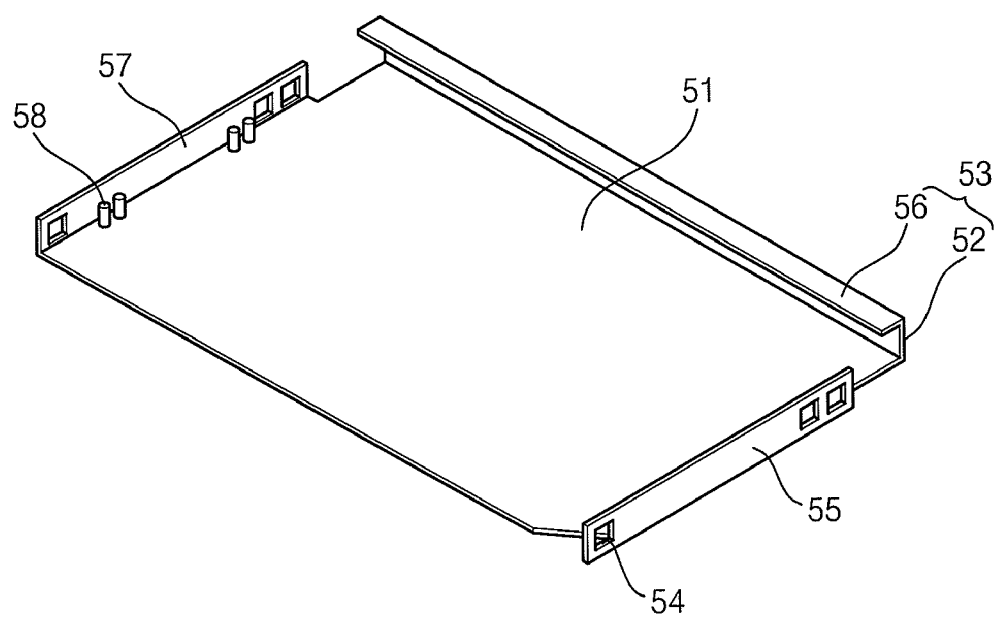
FIG. 5 is a perspective view illustrating a first receiving member in FIG. 2.
Figure 6:
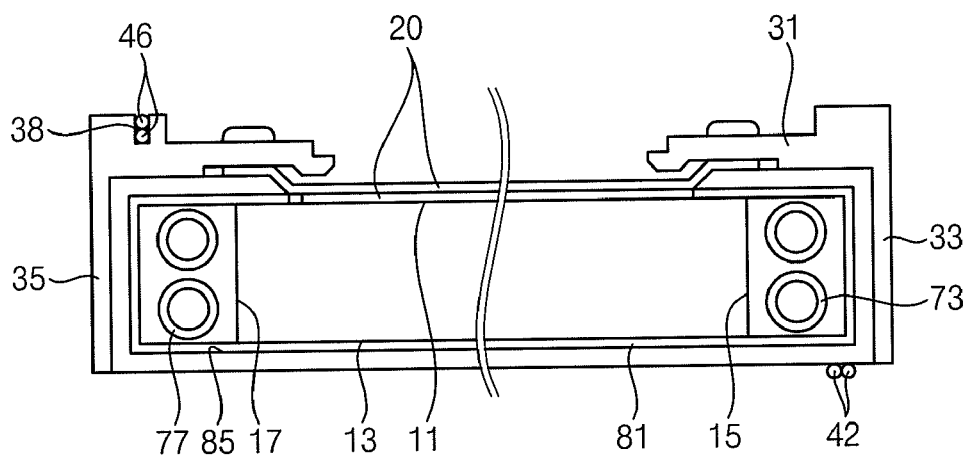
FIG. 6 is a cross-sectional view taken along a line I-I' in FIG. 2.

FIG. 5 is a perspective view illustrating the first receiving member in FIG. 2. FIG. 6 is a cross-sectional view taken along a line I-I' in FIG. 2.

Referring to FIGS. 5 and 6, the first receiving member 50 may be a metal chassis. The first receiving member 50 receives the light-guide plate 10 and may be combined with the side frames, such as the first side frame 33, the third side frame 37 and the fourth side frame 39. The first receiving member 50 may include a first bottom surface 51 and a first sidewall portion 53.

The first bottom surface 51 covers the opposite surface 13 of the light-guide plate 10. The first bottom surface 51 may cover the entire opposite surface 13 or may cover a portion of the opposite surface 13. In the present exemplary embodiment, the first bottom surface 51 covers the opposite surface 13 from a first edge of the opposite surface 13 toward a second edge facing the first edge of the opposite surface 13. The first edge corresponds to the first side surface 15, and the second edge corresponds to the second side surface 17.

The first sidewall portion 53 may include a first side portion 52 and a first upper portion 56. The first side portion 52 is extended along a direction substantially perpendicular to the first bottom surface 51 and faces an inner surface of the first side frame 33. A combining hook, like combining hook 68 shown in FIG. 8, that is combined with the combining hole 36 formed in the first side frame 33 may be formed in the first side portion 52. The first upper portion 56 is extended from an upper end of the first side portion 52 to face the first bottom surface 51, and covers an edge of the light-exiting surface 11.

When viewed from a side of the first receiving member 50, the first bottom surface 51 and the first sidewall portion 53 are C-shaped. A side first portion of the light-guide plate 10 adjacent to the first side surface 15 is inserted into the first sidewall portion 53. That is, the first side surface 15 is inserted into a receiving space that is formed by the first bottom surface 51, the first side portion 52 and the first upper portion 56.

The first receiving member 50 may further include a third sidewall portion 55 and a fourth sidewall portion 57. The third sidewall portion 55 and the fourth sidewall portion 57 are extended from the first bottom surface 51 and face each other. The third sidewall portion 55 and the fourth sidewall portion 57 are disposed along a direction substantially perpendicular to the first sidewall portion 53. The third sidewall portion 55 and the fourth sidewall portion 57 are flat-shaped, whereas the first sidewall portion 53 is C-shaped. The third sidewall portion 55 faces an outer surface of the third side frame 37, and the fourth sidewall portion 57 faces an outer surface of the fourth side frame 39. Second combining units 54, for example, combining holes, may be formed in the third sidewall portion 55 and the fourth sidewall portion 57. The second combining units 54 are combined with the first combining units 32 and 34 formed in the third side frame 37 and the fourth side frame 39.

A portion of the first receiving member 50 in a direction facing the first sidewall portion 53 is open.

Figure 7:
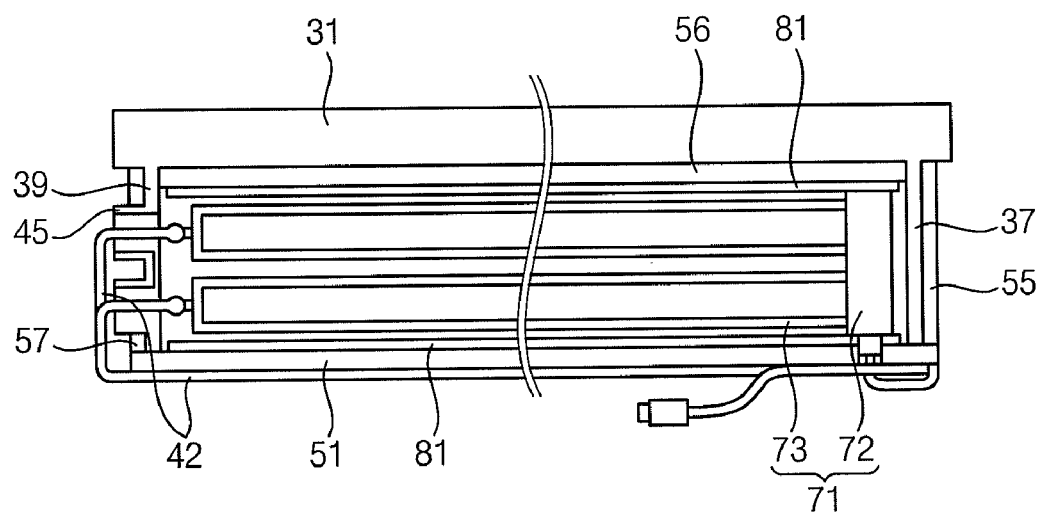
FIG. 7 is a cross-sectional view taken along a line II-II' in FIG. 2.

FIG. 7 is a cross-sectional view taken along a line II-II' in FIG. 2.

Referring to FIGS. 2, 6 and 7, the first light source 71 is disposed between the first side surface 15 of the light-guide plate 10 and the first sidewall portion 53. The first light source 71 may include a first lamp 73 and a first power supply wire and a second power supply wire 42.

The first lamp 73 may be a cold cathode fluorescent lamp (CCFL). The first lamp 73 includes a first lamp body, a first electrode unit and a second electrode unit. The first lamp body includes a lamp tube and a discharge gas charged in the lamp tube. The first electrode unit and the second electrode unit are respectively formed at end portions of the first lamp 73.

The first light source 71 may further include a first lamp holder 72. The end portion of the first lamp 73 having the first electrode unit is fixed and protected by being inserted into the first lamp holder 72. The first electrode unit of the first lamp 73 inserted into the first lamp holder 72 may be connected with the first power supply wire applying a lamp driving power. The first power supply wire may be guided to the outside of the first bottom surface 51 from the first lamp holder 72 through the hole formed in the first bottom surface 51. In another exemplary embodiment of the present invention, the first power supply wire may be guided to the outside from the first lamp holder 72 through the hole formed in the third side frame 37.

The second electrode unit of the first lamp 73 may be connected with the second power supply wire 42 grounding the second electrode unit.

In the present example, the first light source 71 includes two first lamps 73. The second power supply wire 42 connected with each of the second electrode units of the first lamps 73 is guided to the outside of the supporting frame 30 through the first wire-guiding unit formed in the fourth side frame 39 and is guided toward the third side frame 37 corresponding to the first electrode unit along the outside of the first bottom surface 51 corresponding to the first light source 71. In another exemplary embodiment of the present invention, a guiding groove guiding the second power supply wire 42 may be formed at the outside of the first bottom surface 51.

The first reflective sheet 81 is extended along an inner surface of the first receiving member 50. The first reflective sheet 81 includes a bottom surface corresponding to the first bottom surface 51, a side surface corresponding to the first side portion 52 and an upper surface corresponding to a first upper portion 56. The first side surface 15 of the light-guide plate 10 may be inserted into the first reflective sheet 81. The first reflective sheet 81 surrounds the first light source 71 and reflects light exiting from the first light source 71 into the first side surface 15. The first reflective sheet 81 may include a resin material. The first sidewall portion 53 of the first receiving member 50 receives and protects the first reflective sheet 81.

In another exemplary embodiment of the present invention, the first reflective sheet 81 may be coated or laminated at the inner surfaces of the first bottom surface 51 and the first sidewall portion 53 of the first receiving member 50.

The backlight assembly 100 may further include a second light-supplying module. The second light-supplying module includes a second receiving member 60, a second light source 75, and a second reflective sheet 85.

Figure 8:
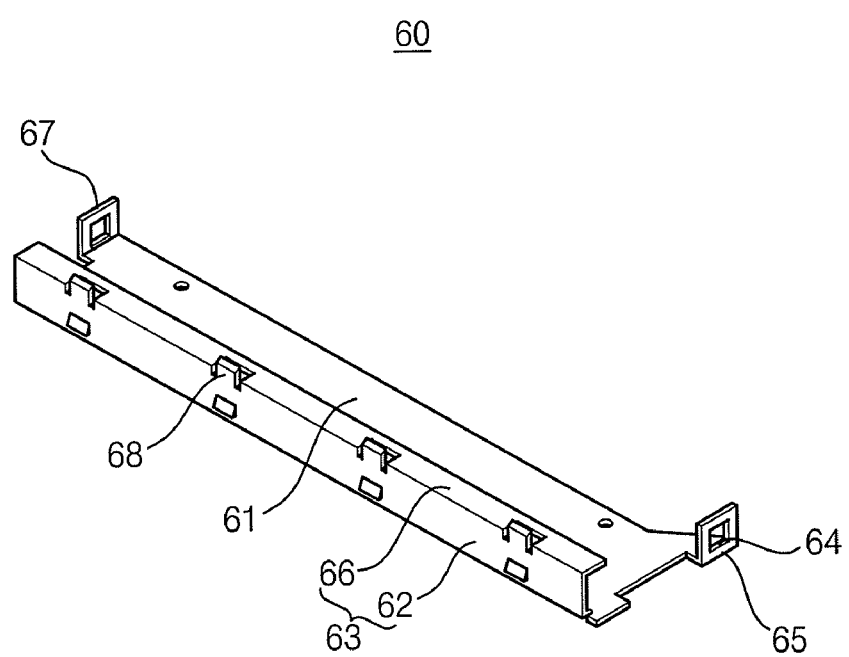
FIG. 8 is a perspective view illustrating a second receiving member in FIG. 2.

FIG. 8 is a perspective view illustrating the second receiving member 60 in FIG. 2.

Referring to FIGS. 5 and 8, the second receiving member 60 may be a metal chassis. The second receiving member 60 receives a portion of the light-guide plate 10 and may be combined with the side frames, such as the second side frame 35, the third side frame 37 and the fourth side frame 39. The second receiving member 60 may include a second bottom surface 61 and a second sidewall portion 63.

The second bottom surface 61 covers the second edge of the opposite surface 13 of the light-guide plate 10. An edge of the second bottom surface 61 is connected with an edge of the first bottom surface 51.

The second sidewall portion 63 may include a second side portion 62 and a second upper portion 66.

The second side portion 62 is extended along a direction substantially perpendicular to the second bottom surface 61 and faces an inner surface of the second side frame 35. A combining hook 68 that is combined with the combining hole 36 formed in the second side frame 35 may be formed in the second side portion 62.

The second upper portion 66 is extended from an upper end of the second side portion 62 to face the second bottom surface 61. When viewed from a side of the second receiving member 60, the second bottom surface 61 and the second sidewall portion 63 are C-shaped. A side second portion of the light-guide plate 10 adjacent to the second side surface 17 is inserted into the second sidewall portion 63. That is, the second side surface 17 is inserted into a receiving space that is formed by the second bottom surface 61, the second side portion 62 and the second upper portion 66.

The second receiving member 60 may further include a fifth sidewall portion 65 and a sixth sidewall portion 67. The fifth sidewall portion 65 and the sixth sidewall portion 67 are extended from the second bottom surface 61 and face each other. The fifth sidewall portion 65 and the sixth sidewall portion 67 are disposed along a direction substantially perpendicular to the second sidewall portion 63. The fifth sidewall portion 65 and the sixth sidewall portion 67 are flat-shaped, whereas the second sidewall portion 63 is C-shaped. The fifth sidewall portion 65 faces an outer surface of the third side frame 37 and the sixth sidewall portion 67 faces an outer surface of the fourth side frame 39. Third combining units 64, for example, combining holes, may be formed in the fifth sidewall portion 65 and the sixth sidewall portion 67. The third combining units 64 are combined with the first combining units 32 and 34 formed in the third side frame 37 and the fourth side frame 39.

A portion of the second receiving member 60 in a direction substantially facing the second sidewall portion 63 is open.

Figure 9:
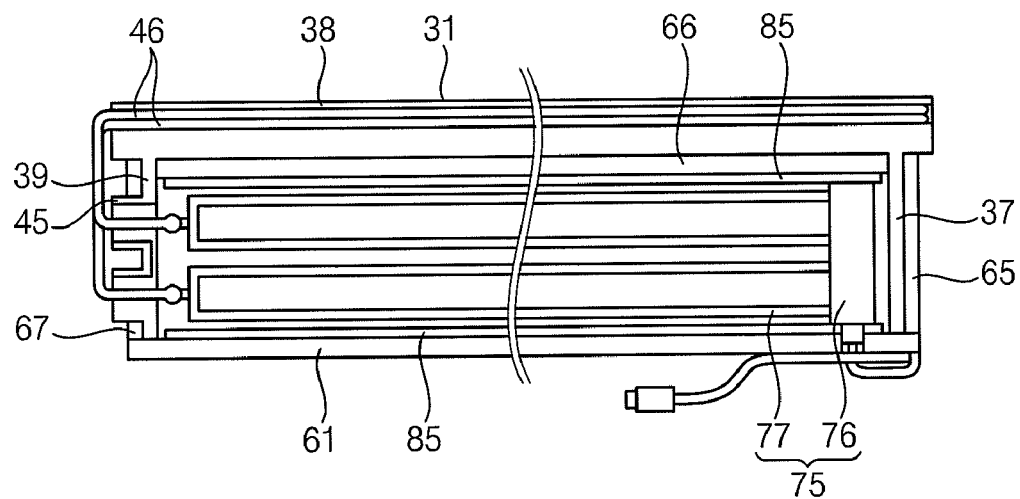
FIG. 9 is a cross-sectional view taken along a line III-III' in FIG. 2.

FIG. 9 is a cross-sectional view taken along a line III-III' in FIG. 2.

Referring to FIGS. 2, 8 and 9, the second light source 75 is disposed between the second side surface 17 of the light-guide plate 10 and the second sidewall portion 63. The second light source 75 may include a second lamp 77 and a third power supply wire and a fourth power supply wire 46.

The second lamp 77 may be a CCFL. The second lamp 77 includes a second lamp body, a third electrode unit and a fourth electrode unit. The third electrode unit and the fourth electrode unit are formed at end portions of the second lamp 77, respectively. The second light source 75 may further include a second lamp holder 76.

The end portion of the second lamp 77 having the third electrode unit is fixed and protected by being inserted into the second lamp holder 76. The third electrode unit of the second lamp 77 inserted into the second lamp holder 76 may be connected with the third power supply wire applying a lamp driving power. The third power supply wire may be guided to the outside of the second bottom surface 61 from second lamp holder 76 through the hole formed in the second bottom surface 61. In another exemplary embodiment of the present invention, the third power supply wire may be guided to the outside from the second lamp holder 76 through the hole formed in the third side frame 37.

The fourth electrode unit of the second lamp 77 may be connected with the fourth power supply wire 46 grounding the fourth electrode unit.

In the present example, the second light source 75 includes two second lamps 77. The fourth power supply wire 46 connected with each of the fourth electrode units of the second lamps 77 is guided to the outside of the supporting frame 30 through a second wire-guiding unit 45 formed in the fourth side frame 39 and is guided toward the third side frame 37 corresponding to the third electrode unit by being inserted into the wire-guiding groove 38 formed in the upper frame part 31.

The second reflective sheet 85 extends along an inner surface of the second bottom surface 61 and an inner surface of the second sidewall portion 63 of the second receiving member 60. The second side surface 17 of the light-guide plate 10 may be inserted into the second reflective sheet 85. The second reflective sheet 85 surrounds the second light source 75 and reflects light exiting from the second light source 75 into the second side surface 17. The second sidewall portion 63 of the second receiving member 60 receives and protects the second reflective sheet 85. The second reflective sheet 85 may be partly overlapped with the first reflective sheet 81.

Referring again to FIG. 3, a first wire-aligning unit 40 and a second wire-aligning unit 41 may be further formed in the third side frame 37 of the supporting frame 30. The first wire-aligning unit 40 is formed at a first longitudinal side of third side frame 37 near the first side frame 33. The second wire-aligning unit 41 is formed at a second longitudinal side of the third side frame 37 near the second side frame 35.

The first wire-aligning unit 40 and the second wire-aligning unit 41 include a round part, a guide boss and a wire inserting part, respectively. The round part includes an aligning groove that is round-shaped from an upper end portion to a lower end portion of the third side frame 37. The guide boss divides the guided power supply wires by protruding from a center portion of the aligning groove. The wire inserting part is protruded from the lower end portion of an outer surface of the third side frame 37. A slit part is formed at a portion facing the outer surface of the third side frame 37 among the wire inserting part. The power supply wires are aligned by being inserted into the wire inserting part, curved along the round aligning groove, and then guided to the outside of the first bottom surface 51 or the outside of the second bottom surface 61.

In particular, referring to FIGS. 2, 3 and 7, the first wire-aligning unit 40 aligns and guides the first power supply wire and the second power supply wire 42 to the outside of the first bottom surface 51. The first power supply wire is guided to the outside of the first bottom surface 51 by the first wire-aligning unit 40, and then to the outside of the first bottom surface 51 again. The second power supply wire 42 is guided along the first bottom surface 51 by the first wire-aligning unit 40, and then to the outside of the first bottom surface 51 again.

The second wire-aligning unit 41 aligns and guides the third power supply wire and the fourth power supply wire 46 to the outside of the second bottom surface 61. The third power supply wire is guided to the outside of the second bottom surface 61 by the second wire-aligning unit 41, and then to the outside of the second bottom surface 61 again. The fourth power supply wire 46 is guided along the wire-guiding groove 38 formed in the upper frame part 31 connected with the second side frame 35. The guided fourth power supply wire 46 is guided to the outside of the second bottom surface 61 by the second wire-aligning unit 41.

Figure 10:
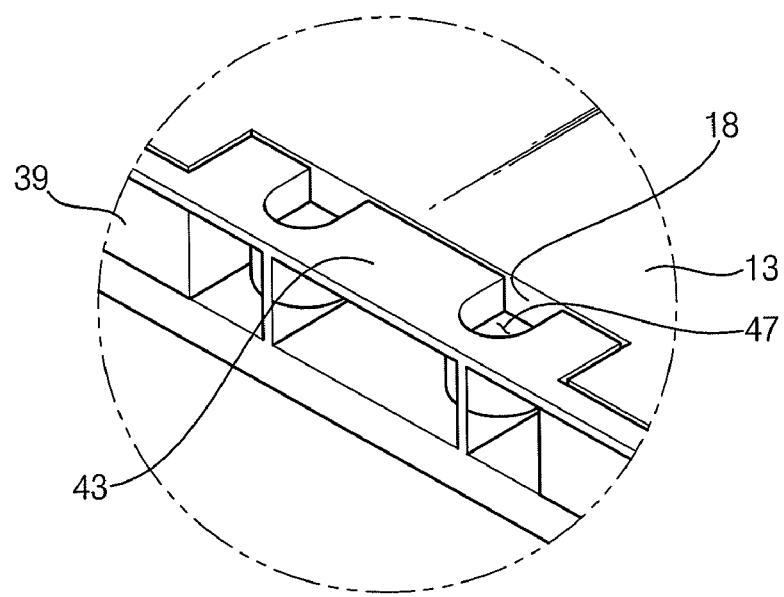
FIG. 10 is a perspective view illustrating a light-guide plate received in the supporting frame in FIG. 2.
Figure 11:
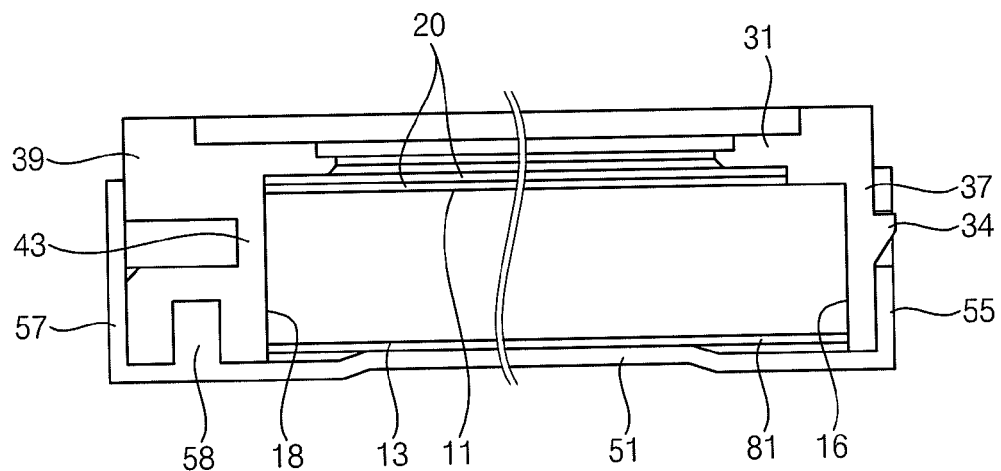
FIG. 11 is a cross-sectional view taken along a line IV-IV' in FIG. 2.

FIG. 10 is a perspective view illustrating a light-guide plate received in the supporting frame in FIG. 2. FIG. 11 is a cross-sectional view taken along a line IV-IV' in FIG. 2.

Referring to FIGS. 10 and 11, as mentioned above, the third side surface 16 of the light-guide plate 10 faces the third side frame 37 and the fourth side surface 18 of the light-guide plate 10 faces fourth side frame 39. The third sidewall portion 55 of the first receiving member 50 and the fifth sidewall portion 65 of the second receiving member 60 are connected with the outer surface of the third side frame 37. The fourth sidewall portion 57 of the first receiving member 50 and the sixth sidewall portion 67 of the first receiving member 60 are connected with the outer surface of the fourth side frame 39.

A guiding groove may be formed in each of the third side surface 16 and the fourth side surface 18 of the light-guide plate 10. Corresponding to the guiding groove, a guiding unit 43 inserted into the guiding groove is protruded from each of inner surfaces of the third side frame 37 and the fourth side frame 39.

The supporting frame 30 generally includes a resin material and the light-guide plate 10 also includes the resin material as mentioned above. Because both the light-guide plate 10 and the supporting frame 30 include resin materials, scratches may be prevented at the guiding groove even though friction is applied to the guiding unit 43 by being inserted into the guiding groove.

As illustrated in FIGS. 10 and 11, a movement-prevention groove 47 may be formed in a lower surface of the guiding unit 43. As illustrated in FIGS. 5 and 11, a movement-prevention protrusion 58 may be formed in the first bottom surface 51 of the first receiving member 50 corresponding to the guiding unit 43 formed in the supporting frame 30. As illustrated in FIGS. 10 and 11, the movement-prevention protrusion 58 is inserted into the movement-prevention groove 47. The movement-prevention protrusion 58 binds the supporting frame 30 and prevents the supporting frame 30 from being moved to the first light source 71 or second light source 75 due to external impacts.

Figure 12:
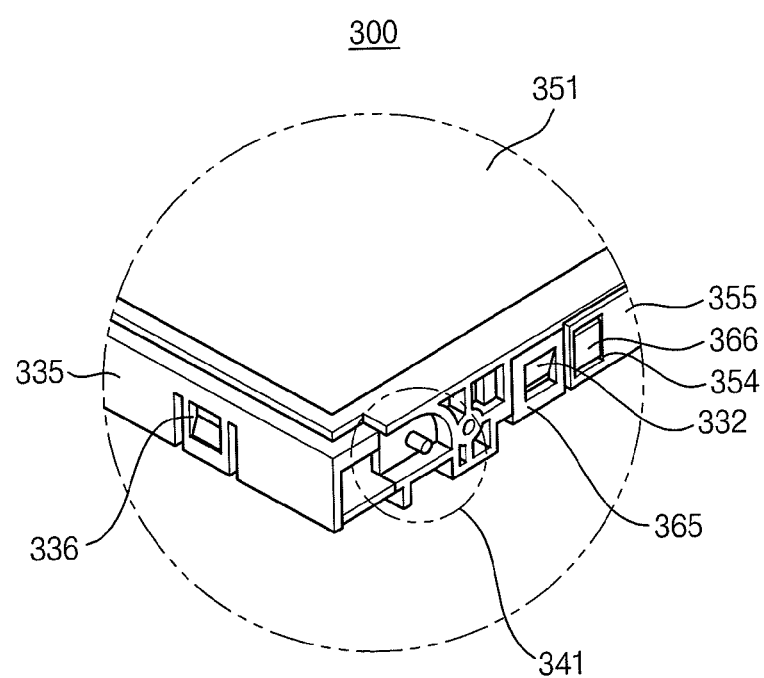
FIG. 12 is a perspective view illustrating a backlight assembly according to another exemplary embodiment of the present invention.
Figure 13:
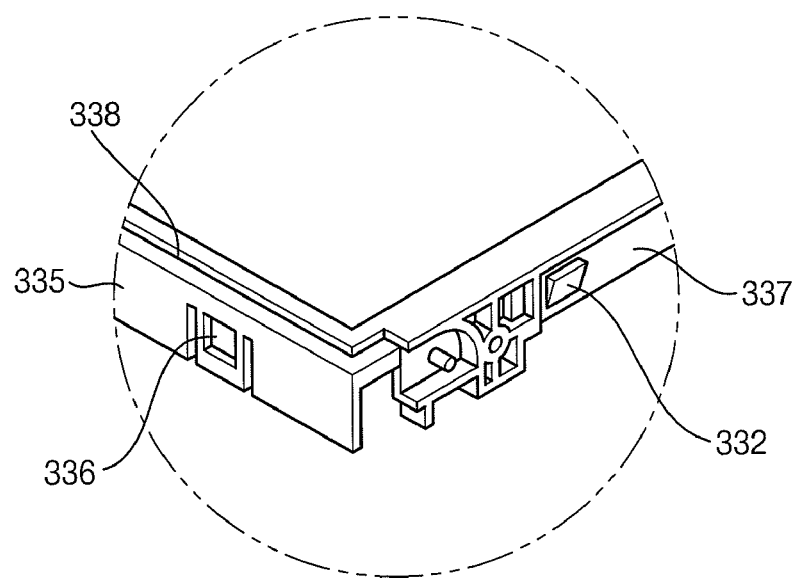
FIG. 13 is a perspective view illustrating a supporting frame in FIG. 12.
Figure 14:
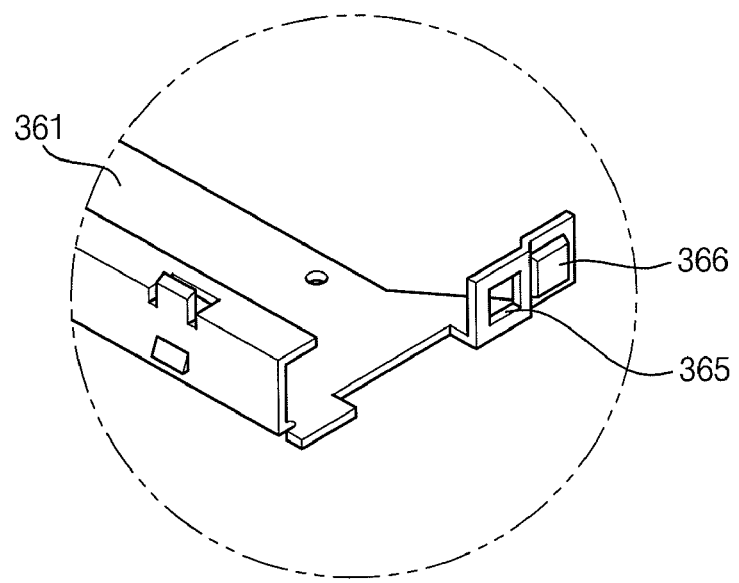
FIG. 14 is a perspective view illustrating a second receiving member in FIG. 12.

FIG. 12 is a perspective view illustrating a backlight assembly according to another exemplary embodiment of the present invention. FIG. 13 is a perspective view illustrating the supporting frame in FIG. 12. FIG. 14 is a perspective view illustrating the second receiving member in FIG. 12.

Referring to FIGS. 12, 13 and 14, a backlight assembly 300 may be substantially the same as the backlight assembly 100 in FIGS. 1 to 11, except for a supporting frame 330 and a second receiving member 360.

In the present example, a first coupling unit 354 may be formed in a third sidewall portion 355 and a fourth sidewall portion of a first receiving member. The first coupling unit 354 may be formed at end portions along a longitudinal direction of the third sidewall portion 355 and the fourth sidewall portion. The first coupling unit 354 may be a coupling hole.

The second receiving member 360 may be substantially the same as the second receiving member 60 in FIG. 8, except for further including a second coupling unit 366. The second coupling unit 366 may be further formed at end portions along a longitudinal direction of a fifth sidewall portion 365 and a sixth sidewall portion of the second receiving member 360. A stepped portion respectively stepped to a third side frame 337 and a fourth side frame is formed at each of end portions along a longitudinal direction of the fifth sidewall portion 365 and the sixth sidewall portion. The first coupling unit 354 may be formed at the stepped portion. Because the stepped portion compensates for the step of the first coupling unit 354, the third sidewall portion 355 and the fifth sidewall portion 365 or the fourth sidewall portion and the sixth sidewall portion may be flush with each other.

The second coupling unit 366 is formed on a base surface of the stepped portion and is coupled to the first coupling unit 354. The second coupling unit 366 may include a coupling protrusion protruded from the base surface of the stepped portion to be coupled with the coupling hole.

A first combining unit 332 formed in the third side frame 337 of the supporting frame 330 is inserted into a third combining unit formed at the fifth sidewall portion 365.

An outer surface of the third side frame 337 corresponding to the second coupling unit 366 may be flat.

The fourth combining unit formed in the fourth side frame is combined with a second combining unit of the first receiving member 350 and a third combining unit of the second receiving member 360. The first receiving member 350 and the second receiving member 360 are combined with the supporting frame 330 by being exactly aligned with each other.

In another exemplary embodiment of the present invention, a protrusion part may be formed in the first coupling unit 354, and the second coupling unit 366 may include a coupling hole coupled with the protrusion part of the first coupling unit 354.

Figure 15:
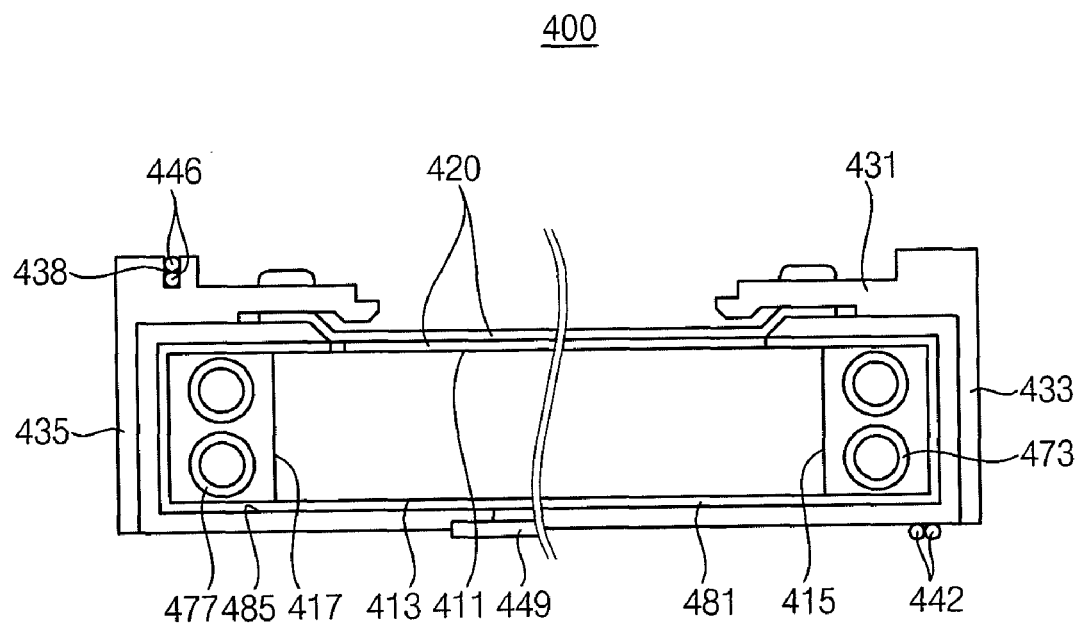
FIG. 15 is a cross-sectional view illustrating a backlight assembly according to another exemplary embodiment of the present invention.

FIG. 15 is a cross-sectional view illustrating a backlight assembly according to another exemplary embodiment of the present invention.

Referring to FIG. 15, a backlight assembly 400 may be substantially the same as the backlight assembly 100 in FIGS. 1 to 11, except for further including an adhesive member 449.

The adhesive member 449 may include adhesive tape. The adhesive member 449 is adhered to each of a first bottom surface and a second bottom surface along an edge of the second bottom surface coupled with an edge of the first bottom surface. The adhesive member 449 fixes the first bottom surface and the second bottom surface with each other and prevents foreign substances from flowing into the inside of the backlight assembly 400.

Figure 16:
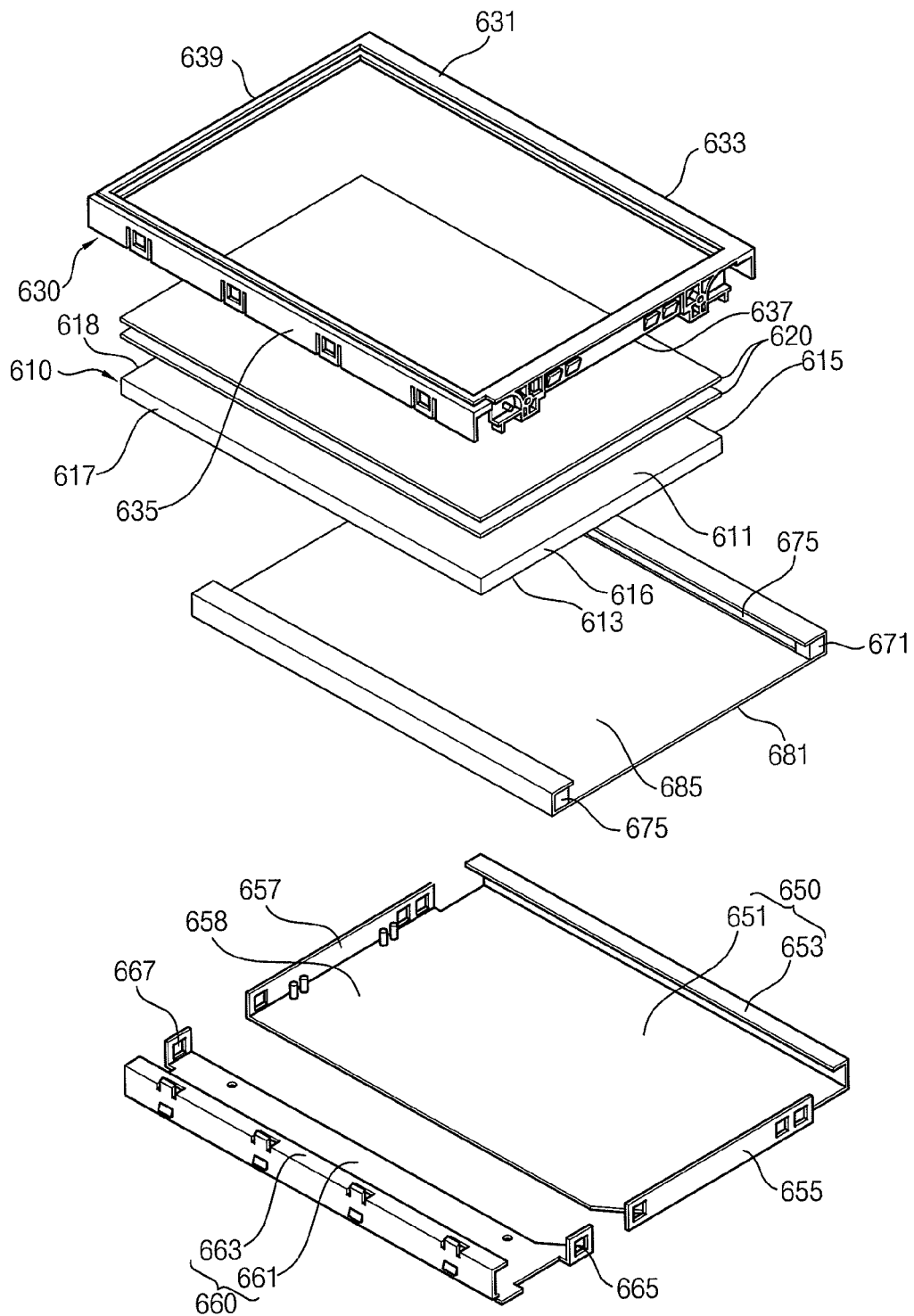
FIG. 16 is an exploded perspective view illustrating a backlight assembly according to still another exemplary embodiment of the present invention.

FIG. 16 is an exploded perspective view illustrating a backlight assembly according to still another exemplary embodiment of the present invention.

Referring to FIG. 16, the backlight assembly 600 may be substantially the same as the backlight assembly 100 in FIGS. 1 to 11, except for a first light-supplying module and a second light-supplying module.

The first light-supplying module and the second light-supplying module may be substantially the same as the backlight assembly 100 in FIGS. 1 to 11, except for reflective sheets integrated with each other.

In the present example, as illustrated in FIG. 16, the first reflective sheet and the second reflective sheet may be integrated as a reflective sheet 681. That is, an edge of the first bottom surface of the first reflective sheet may be coupled with an edge of the second bottom surface of the second reflective sheet.

The reflective sheet 681 and a light-guide plate 610 may be inserted into the first receiving member 650 and a second receiving member 660 by being slid in a direction parallel with a first bottom surface 651 and a second bottom surface 661.

Display Device

Figure 17:
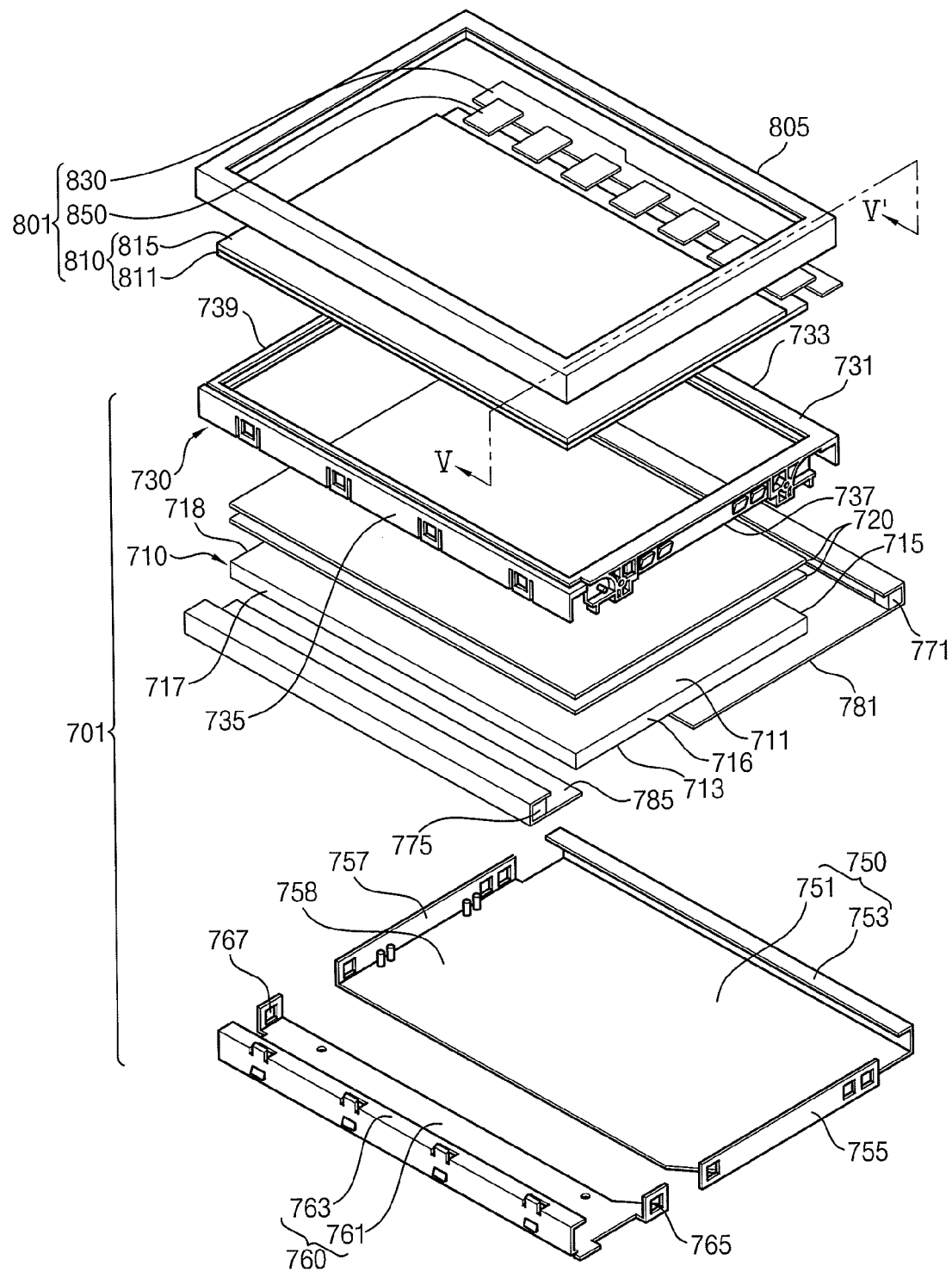
FIG. 17 is an exploded perspective view illustrating a display device according to another exemplary embodiment of the present invention.
Figure 18:
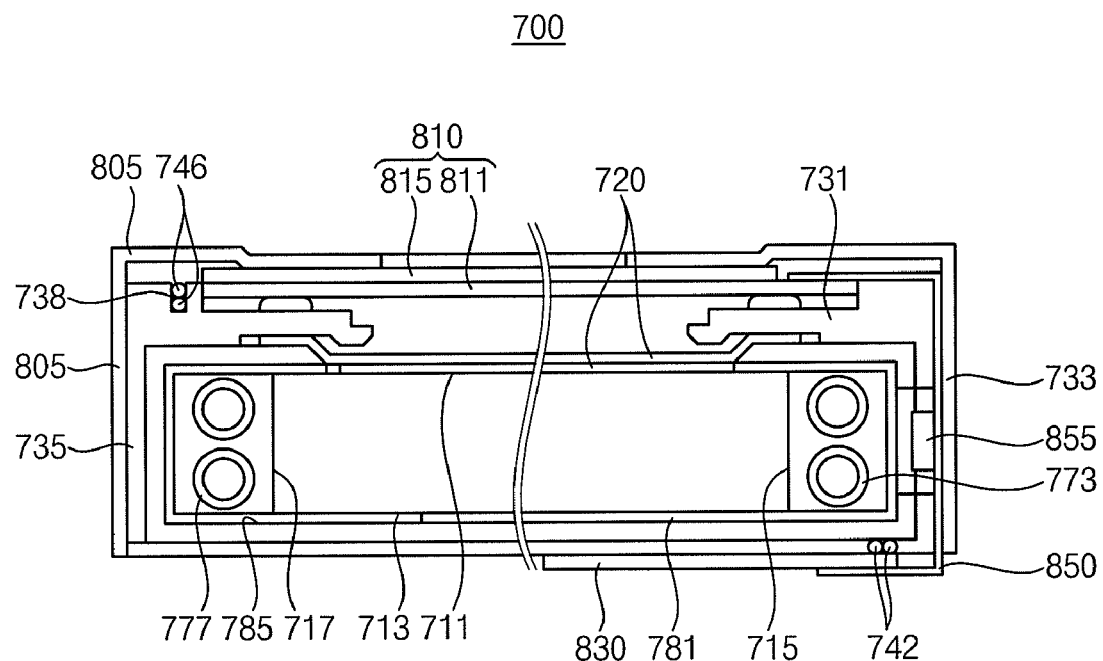
FIG. 18 is a cross-sectional view taken along a line V-V' in FIG. 17.

FIG. 17 is an exploded perspective view illustrating a display device according to an exemplary embodiment of the present invention. FIG. 18 is a cross-sectional view taken along a line V-V' in FIG. 17.

Referring to FIGS. 17 and 18, a display device 700 includes a backlight assembly 701 and a display panel module 801.

The backlight assembly 701 may be substantially the same as the backlight assembly 100 in FIGS. 1 to 11. The backlight assembly 701 includes a light-guide plate 710, a first light-supplying module, a second light-supplying module and a supporting frame 730.

A stepped portion receiving the display panel module 801 is formed at an upper frame part 731 of the supporting frame 730.

The display panel module 801 includes a display panel 810, a printed circuit board (PCB) 830 and a flexible printed circuit board (PCB) 850.

The display panel 810 receives light exiting from an optical sheet 720 and converts the light into image light including image information. The display panel 810 is disposed on the stepped portion formed at the upper frame part 731. The display panel 810 includes a first substrate 811, a second substrate 815 facing the first substrate 811, and a liquid crystal layer disposed between the first substrate 811 and the second substrate 815.

The first substrate 811 may include a pixel electrode. The second substrate 815 may include a color filter unit and a common electrode corresponding to the pixel electrode. The arrangement of the liquid crystal layer varies as an electric field formed between the pixel electrode and the common electrode is changed. The display panel 810 displays a desired gradational image by varying the light permeability of the liquid crystal layer.

The PCB 830 outputs a panel driving signal forming the electric field to the display panel 810. The PCB 830 may be formed on the outside of a first bottom plate 751.

The FPCB 850 electrically connects the PCB 830 with a junction part that is formed at an edge of the first substrate 811 by conforming to the shape of a first side frame 733 corresponding to a first sidewall portion 753. A panel driving chip 855 may be formed on the FPCB 850. As illustrated in FIG. 17, an open portion is formed at a first side portion and the first side frame 733 of the first sidewall portion 753 to avoid interfering with the panel driving chip 855.

The display device 700 may further include a top chassis 805. The top chassis 805 is connected with the supporting frame 730 or a first receiving member 750, and a second receiving member 760 while exposing a display screen of the display panel 810.

The backlight assembly and the display device having the backlight assembly according to the present invention may be applied to a backlight of a flat display device used by a monitor and may be applied to the flat display device used by the monitor.

Having described the exemplary embodiments of the present invention and its features, it is noted that various changes, substitutions and alterations can be made herein without departing from the spirit and scope of the invention as defined by appended claims.

What is claimed is:

1. A backlight assembly comprising:
a light-guide plate including a light-exiting surface, an opposite surface facing the light-exiting surface, a first side surface and a second side surface facing the first side surface, the first and second side surfaces connecting the light-exiting surface with the opposite surface;

a supporting frame exposing a portion of the light-exiting surface and receiving the light-guide plate; and a first light-supplying module including a first receiving member that has a first bottom surface to cover at least some portion of the opposite surface, a first sidewall portion to receive a first side portion of the light-guide plate adjacent to the first side surface, a first light source disposed between the first side surface and the first sidewall portion, and a first reflective sheet facing the first side surface and the opposite surface to surround the first light source between the light-guide plate and the first receiving member;

a second light-supplying module including a second receiving member having a second bottom surface connected to an edge of the first bottom surface to cover at least the other portion of the opposite surface, and a second sidewall portion to receive a second side portion of the light-guide plate adjacent to the second side surface, a second light source disposed between the second side surface and the second sidewall portion, and a second reflective sheet facing the second side surface and the opposite surface to surround the second light source between the light-guide plate and the second receiving member, the second reflective sheet being partly overlapped with the first reflective sheet, wherein the second light source comprises:
a second lamp having a second lamp body disposed between the second side surface and the second reflective sheet, a third electrode unit and a fourth electrode unit disposed on end portions of the second lamp body that face each other;
a third power supply wire electrically connected with the third electrode unit to supply the lamp driving power; and
a fourth power supply wire electrically connected with the fourth electrode unit and guided toward the fourth electrode unit along the upper frame part, wherein the supporting frame includes an upper frame part exposing the portion of the light-exiting surface and supporting edges of the light-exiting surface, a first side frame part and a second side frame part respectively facing an outer surface of the first sidewall portion and an outer surface of the second sidewall portion, and a third side frame part and a fourth side frame part respectively connected to the first side frame part and the second side frame part, wherein a guiding groove is formed in each of a third side surface of the light-guide plate facing the third side frame part and a fourth side surface of the light-guide plate facing the fourth side frame part.

2. The backlight assembly of claim 1, wherein the first receiving member further comprises a third sidewall portion facing an outer surface of the third side frame part and a fourth sidewall portion facing an outer surface of the fourth side frame part, and the second receiving member further comprises a fifth sidewall portion facing the outer surface of the third side frame part and a sixth sidewall portion facing the outer surface of the fourth side frame part.

3. The backlight assembly of claim 2, wherein a first combining unit is formed in each of the third side frame part and the fourth side frame part, and a second combining unit combined with the first combining unit is formed at each of the third sidewall portion, the fourth sidewall portion, the fifth sidewall portion and the sixth sidewall portion.

4. The backlight assembly of claim 2, wherein a first coupling unit is formed at end portions along a longitudinal direction of the third sidewall portion and the fourth sidewall portion, and a second coupling unit coupled to the first coupling unit is formed at end portions along a longitudinal direction of the fifth sidewall portion and the sixth sidewall portion.

5. The backlight assembly of claim 4, wherein a stepped portion respectively stepped to the third side frame part and the fourth side frame part is formed at the end portions along a longitudinal direction of the fifth sidewall portion and the sixth sidewall portion, and the first coupling unit is formed at the stepped portion.

6. The backlight assembly of claim , wherein the first coupling unit includes a coupling hole, and the second coupling unit includes a coupling protrusion protruded from a base surface of the stepped portion to be coupled with the coupling hole.

7. The backlight assembly of claim 1, wherein a guiding unit inserted into the guiding groove is respectively protruded from the third side frame part and the fourth side frame part.

8. The backlight assembly of claim 7, wherein a movement-prevention groove is formed in a lower surface of the guiding unit, and a movement-prevention protrusion formed in the first bottom surface and inserted into the movement-prevention groove to prevent movement of the supporting frame to the first light source or the second light source due to external impacts.

9. The backlight assembly of claim 1, wherein the first light source comprises:
a first lamp having a first lamp body disposed between the first side surface and the first reflective sheet, a first electrode unit and a second electrode unit disposed on end portions of the first lamp body that face each other;
a first power supply wire electrically connected with the first electrode unit to supply a lamp driving power; and
a second power supply wire electrically connected with the second electrode unit and guided toward the first electrode unit along the outside of the first bottom surface.

10. The backlight assembly of claim 9, wherein a wire-guiding groove guiding the third power supply wire is formed in an upper surface of the upper frame part corresponding to the second lamp body.

11. The backlight assembly of claim 10, wherein a first wire-aligning unit and a second wire-aligning unit are formed in an outer surface of the third side frame part, the first wire-aligning unit guides the first power supply wire and the second power supply wire to the outside of the first bottom surface, the first power supply wire guided through the third side frame part, and the second power supply wire guided to the third side frame part along the outside of the first bottom surface, and the second wire-aligning unit guides the third power supply wire and the fourth power supply wire to the outside of the second bottom surface, the third power supply wire guided through the third side frame part, and the fourth power supply wire guided to the third side frame part along the wire-guiding groove.

12. The backlight assembly of claim 9, wherein a first wire-guiding unit and a second wire-guiding unit are formed on an outer surface of the fourth side frame part, the first wire-guiding unit guiding the second power supply wire corresponding to the second electrode unit, and the second wire-guiding unit guiding the fourth power supply wire corresponding to the fourth electrode unit.

13. The backlight assembly of claim 1, wherein the first reflective sheet and the second reflective sheet are respectively coated on the inner surface of the first receiving member and the inner surface of the second receiving member.

14. The backlight assembly of claim 1, wherein the first reflective sheet and the second reflective sheet are integrated with each other.

15. The backlight assembly of claim 1, further comprising an adhesive member, wherein the adhesive member fixes the first bottom surface with the second bottom surface by respectively adhering to the first bottom surface and the second bottom surface along the edge of the second bottom surface connected with the edge of the first bottom surface.

16. A display device comprising:
 a light-guide plate including a light-exiting surface, an opposite surface facing the light-exiting surface, a first side surface and a second side surface facing the first side surface, the first and second side surfaces connecting the light-exiting surface with the opposite surface;
 a first light-supplying module including a first receiving member that has a first bottom surface to cover at least some portion of the opposite surface and a first sidewall portion to receive at least a side first portion of the light-guide plate adjacent to the first side surface, and a first light source unit disposed between the first side surface and the first sidewall portion;
 a second light-supplying module including a second receiving member that has a second bottom surface to cover at least the other portion of the opposite surface and a second sidewall portion to receive at least a side second portion of the light-guide plate adjacent to the second side surface, and a second light source unit disposed between the second side surface and the second sidewall portion;
 a supporting frame including an upper frame part that supports edges of the light-exiting surface, and side frame parts that have first combining units combined respectively with the first receiving member and the second receiving member; and
 a display panel module including a display panel disposed on the supporting frame,
 wherein the first light source unit comprises:
  a first lamp having a first lamp body for supplying the first side surface with light, a first electrode unit and a second electrode unit disposed on end portions of the first lamp body that face each other;
  a first reflective sheet extended along the opposite surface to surround the first lamp and receiving a first side portion of the light-guide plate adjacent to the first side surface;
  a first power supply wire supplying the first electrode unit with a lamp driving power; and
  a second power supply wire electrically connected with the second electrode unit and guided toward the first electrode unit along the outside of the first bottom surface corresponding to the portion of the edge of the display panel.

17. The display device of claim 16, wherein the first receiving member further comprises a third sidewall portion and a fourth sidewall portion facing the third sidewall portion, the third sidewall portion and the fourth sidewall portion being substantially perpendicular to the first sidewall portion and having second combining units combined with the first combining units, and
 the second receiving member further comprises a fifth sidewall portion and a sixth sidewall portion facing the fifth sidewall portion, the fifth sidewall portion and the sixth sidewall portion being substantially perpendicular to the second sidewall portion and having third combining units combined with the first combining units.

18. The display device of claim 17, wherein a first coupling unit is further formed at end portions along a longitudinal direction of the third sidewall portion and the fourth sidewall portion, and
 a stepped portion and a second coupling unit are further formed at end portions along a longitudinal direction of the fifth sidewall portion and the sixth sidewall portion, the stepped portion stepped to the side portion of the supporting frame to include the first coupling unit and a second coupling unit formed on a base surface of the stepped portion to couple first coupling unit.

19. The display device of claim 16, wherein the light-guide plate further comprises a third side surface and a fourth side surface that connect the first side surface with the second side surface and face the side frame parts,
 a guiding groove is formed in each of the third side surface and the fourth side surface facing the third side surface of the light-guide plate and
 a guiding unit inserted into the guiding groove is respectively protruded from an inner surface of the side frame parts.

20. The display device of claim 19, wherein a movement-prevention groove is formed in a lower surface of the guiding unit, and
 a movement-prevention protrusion inserted into the movement-prevention groove is formed in the first bottom surface.

21. The display device of claim 16, wherein the second light source unit comprises:
 a second lamp having a second lamp body for supplying the second side surface with light, a third electrode unit and a fourth electrode unit disposed on end portions of the second lamp body that face each other;
 a second reflective sheet extended along the opposite surface to surround the second lamp and receiving a second side portion of the light-guide plate adjacent to the second side surface;
 a third power supply wire supplying the third electrode unit with a lamp driving power; and
 a fourth power supply wire electrically connected with the fourth electrode unit and guided toward the third electrode unit by a wire-guiding groove formed in an upper surface of the upper frame.

* * * * *